United States Patent [19]

Kamiguchi et al.

[11] Patent Number: 5,344,301
[45] Date of Patent: Sep. 6, 1994

[54] OPERATING TIME ANALYZING APPARATUS FOR AN INJECTION MOLDING MACHINE

[75] Inventors: Masao Kamiguchi; Osamu Saito, both Oshino; Kazuo Kubota, Fujiyoshida; Masanobu Takemoto, Oshino, all of Japan

[73] Assignee: Fanuc Ltd., Yamanashi, Japan

[21] Appl. No.: 961,900

[22] PCT Filed: May 14, 1992

[86] PCT No.: PCT/JP92/00623

§ 371 Date: Jan. 8, 1993

§ 102(e) Date: Jan. 8, 1993

[87] PCT Pub. No.: WO92/20509

PCT Pub. Date: Nov. 26, 1992

[30] Foreign Application Priority Data

May 18, 1991 [JP] Japan ................................. 1-140582

[51] Int. Cl.$^5$ .............................................. B29C 45/76
[52] U.S. Cl. .................................. 425/169; 264/40.1; 425/170; 425/171
[58] Field of Search ............... 425/155, 156, 135, 169, 425/170, 171; 264/40.1

[56] References Cited

U.S. PATENT DOCUMENTS 5,200,126  4/1993  Wenskus, Jr. et al. ............. 425/155

FOREIGN PATENT DOCUMENTS

| | | |
|---|---|---|
| 0273981 | 7/1988 | European Pat. Off. . |
| 0487740 | 6/1992 | European Pat. Off. . |
| 57-212042 | 12/1982 | Japan . |
| 58-24962 | 2/1983 | Japan . |
| 58-132446 | 8/1983 | Japan . |
| 1-90718 | 4/1989 | Japan . |
| 01090718 | 4/1989 | Japan . |
| 02213904 | 8/1990 | Japan . |
| 03203621 | 9/1991 | Japan . |
| 04084305 | 3/1992 | Japan . |
| 04331125 | 11/1992 | Japan . |
| 9119601 | 12/1991 | World Int. Prop. O. . |

OTHER PUBLICATIONS

Y. Tsuboi, "Applications of a minicomputer in labor serving and automation", Information Processing, vol. 15, No. 4, pp. 240–245, Apr. 1974, Tokyo.

Primary Examiner—Tim Heitbrink
Attorney, Agent, or Firm—Staas & Halsey

[57] ABSTRACT

An operating time analyzing apparatus capable of automatically determining, storing, and analyzing the operating time of an injection molding machine for each operating condition. This apparatus detects the operating conditions of the injection molding machine through internal processing with a PMCCPU 14 for the sequence control of the injection molding machine. While specific operating conditions are detected, fine times $\Delta t$, execution cycles of the internal processing, are added in succession. By doing this, integrated time for each operating condition, that is, operating time for each operating condition, is calculated. This operating time is stored in a nonvolatile RAM 8 for each operating condition of the injection molding machine through the processing by the PMCCPU 14. The respective time-based ratios of the individual operating states and the like are calculated on the basis of the correlation between the operating times stored for the individual operating conditions, and displayed, along with the operating times for the individual operating conditions, with a CRT display unit of a manual data input device 18 corresponding to the operating conditions of the injection molding machine.

17 Claims, 8 Drawing Sheets

FIG. 7

MEMORY MAP OF FILE FOR STORING DAILY DATA FOR EACH MONTH

| ADDRESS | ( d ) | 1 | 2 | 3 | • • • • • | 30 | 31 |
|---|---|---|---|---|---|---|---|
| POWER-ON TIME | (Tσd) | - | - | - | • • • • • | - | - |
| PERCENTAGE | (Tσ'd) | - | - | - | • • • • • | - | - |
| HEATER HEAT-UP TIME | (Tad) | - | - | - | • • • • • | - | - |
| PERCENTAGE | (Ta'd) | - | - | - | • • • • • | - | - |
| ALARM GENERATION TIME | (Tbd) | - | - | - | • • • • • | - | - |
| PERCENTAGE | (Tb'd) | - | - | - | • • • • • | - | - |
| STOPPING TIME AFTER COMPLETION OF PRODUCTION | (Tcd) | - | - | - | • • • • • | - | - |
| PERCENTAGE | (Tc'd) | - | - | - | • • • • • | - | - |
| MANUAL OPERATION TIME | (Tdd) | - | - | - | • • • • • | - | - |
| PERCENTAGE | (Td'd) | - | - | - | • • • • • | - | - |
| SEMIAUTOMATIC OPERATION TIME | (Ted) | - | - | - | • • • • • | - | - |
| PERCENTAGE | (Te'd) | - | - | - | • • • • • | - | - |
| AUTOMATIC OPERATION TIME | (Tfd) | - | - | - | • • • • • | - | - |
| PERCENTAGE | (Tf'd) | - | - | - | • • • • • | - | - |
| OTHER TIMES | (Tgd) | - | - | - | • • • • • | - | - |
| PERCENTAGE | (Tg'd) | - | - | - | • • • • • | - | - |

FIG. 8

MEMORY MAP OF FILE FOR STORING MONTHLY DATA FOR EACH YEAR

| ADDRESS | ( m ) | 1 | 2 | 3 | • • • • • | 11 | 12 |
|---|---|---|---|---|---|---|---|
| POWER-ON TIME | (Tσm) | - | - | - | • • • • • | - | - |
| PERCENTAGE | (Tσ'm) | - | - | - | • • • • • | - | - |
| HEATER HEAT-UP TIME | (Tam) | - | - | - | • • • • • | - | - |
| PERCENTAGE | (Ta'm) | - | - | - | • • • • • | - | - |
| ALARM GENERATION TIME | (Tbm) | - | - | - | • • • • • | - | - |
| PERCENTAGE | (Tb'm) | - | - | - | • • • • • | - | - |
| STOPPING TIME AFTER COMPLETION OF PRODUCTION | (Tcm) | - | - | - | • • • • • | - | - |
| PERCENTAGE | (Tc'm) | - | - | - | • • • • • | - | - |
| MANUAL OPERATION TIME | (Tdm) | - | - | - | • • • • • | - | - |
| PERCENTAGE | (Td'm) | - | - | - | • • • • • | - | - |
| SEMIAUTOMATIC OPERATION TIME | (Tem) | - | - | - | • • • • • | - | - |
| PERCENTAGE | (Te'm) | - | - | - | • • • • • | - | - |
| AUTOMATIC OPERATION TIME | (Tfm) | - | - | - | • • • • • | - | - |
| PERCENTAGE | (Tf'm) | - | - | - | • • • • • | - | - |
| OTHER TIMES | (Tgm) | - | - | - | • • • • • | - | - |
| PERCENTAGE | (Tg'm) | - | - | - | • • • • • | - | - |

FIG. 9 (a)

|  | CURRENT MONTH → ▼ ← PRECEDING MONTH | | | | | |
|---|---|---|---|---|---|---|
| (DATE) | 1 | 2 | 3 • • • • • • • • • • • • • • • 29 | | 30 | 31 |
| POWER-ON TIME (%) | - - | - - | • • • • • • • • • • • • • • • • -<br>• • • • • • • • • • • • • • • • - | | - - | - - |
| HEATER HEAT-UP TIME (%) | - - | - - | • • • • • • • • • • • • • • • • -<br>• • • • • • • • • • • • • • • • - | | - - | - - |
| ALARM GENERATION TIME (%) | - - | - - | • • • • • • • • • • • • • • • • -<br>• • • • • • • • • • • • • • • • - | | - - | - - |
| STOPPING TIME AFTER COMPLETION OF PRODUCTION (%) | - - | - - | • • • • • • • • • • • • • • • • -<br>• • • • • • • • • • • • • • • • - | | - - | - - |
| MANUAL OPERATION TIME (%) | - - | - - | • • • • • • • • • • • • • • • • -<br>• • • • • • • • • • • • • • • • - | | - - | - - |
| SEMIAUTOMATIC OPERATION TIME (%) | - - | - - | • • • • • • • • • • • • • • • • -<br>• • • • • • • • • • • • • • • • - | | - - | - - |
| AUTOMATIC OPERATION TIME (%) | - - | - - | • • • • • • • • • • • • • • • • -<br>• • • • • • • • • • • • • • • • - | | - - | - - |
| OTHER TIMES (%) | - - | - - | • • • • • • • • • • • • • • • • -<br>• • • • • • • • • • • • • • • • - | | - - | - - |

FIG. 9 (b)

|  | CURRENT YEAR → ▼ ← PRECEDING YEAR | | | | | |
|---|---|---|---|---|---|---|
| (DATE) | 1 | 2 | 3 • • • • • • • • • • • • • • • 10 | | 11 | 12 |
| POWER-ON TIME (%) | - - | - - | • • • • • • • • • • • • • • • • -<br>• • • • • • • • • • • • • • • • - | | - - | - - |
| HEATER HEAT-UP TIME (%) | - - | - - | • • • • • • • • • • • • • • • • -<br>• • • • • • • • • • • • • • • • - | | - - | - - |
| ALARM GENERATION TIME (%) | - - | - - | • • • • • • • • • • • • • • • • -<br>• • • • • • • • • • • • • • • • - | | - - | - - |
| STOPPING TIME AFTER COMPLETION OF PRODUCTION (%) | - - | - - | • • • • • • • • • • • • • • • • -<br>• • • • • • • • • • • • • • • • - | | - - | - - |
| MANUAL OPERATION TIME (%) | - - | - - | • • • • • • • • • • • • • • • • -<br>• • • • • • • • • • • • • • • • - | | - - | - - |
| SEMIAUTOMATIC OPERATION TIME (%) | - - | - - | • • • • • • • • • • • • • • • • -<br>• • • • • • • • • • • • • • • • - | | - - | - - |
| AUTOMATIC OPERATION TIME (%) | - - | - - | • • • • • • • • • • • • • • • • -<br>• • • • • • • • • • • • • • • • - | | - - | - - |
| OTHER TIMES (%) | - - | - - | • • • • • • • • • • • • • • • • -<br>• • • • • • • • • • • • • • • • - | | - - | - - |

OPERATING TIME ANALYZING APPARATUS FOR AN INJECTION MOLDING MACHINE

BACKGROUND OF THE INVENTION

1. Field of the Invention

The present invention relates to an operating time analyzing apparatus for measuring and totalizing elapsed times associated with specific operating conditions of an injection molding machine.

2. Description of the Related Art

In order to carry out periodical inspection, production management, etc. for injection molding machines in a rationalized manner, it is necessary to periodically analyze the times during which the injection molding machines are operated in various operating conditions.

In the case of a conventional injection molding machine, its operator manipulates a timer, stopwatch, or the like depending on the operating condition of the machine for manually measuring the automatic or manual operation time, time loss attributable to the generation of alarms, etc., and recording or writing down the obtained information in a daily work report or the like. Sometimes, however, the operator may erroneously operate the timer, stopwatch, or the like, so that it has been difficult to obtain accurate results of measurement at all times.

Moreover, in an ordinary injection molding operation, one operator is generally assigned to control about ten injection molding machines. Under such circumstances, however, it is not easy for the operator to operate the timer, stopwatch, etc., and keep the results of measurements on record for each and all such injection molding machines by making entries in the daily work report. Besides, the operator is likely to make interpretative and calculative errors in the processing of the operating time analysis as far as the analysis depends on the manual calculation based on the raw data recorded on the daily work report or the like. If the operating times are analyzed through manual calculation based on firsthand time data described in the work diary or the like, moreover, misreading of data or calculation errors are liable to be caused.

SUMMARY OF THE INVENTION

The object of the present invention is to provide an operating time analyzing apparatus for an injection molding machine, capable of accurately analyzing and storing an operating time for each operating condition without bothering an operator.

In order to achieve the above object, a first embodiment of the present invention comprises operating condition detecting means for detecting various operating conditions of an injection molding machine, a plurality of timer means for cumulatively recording times for various operating conditions detected by means of the operating condition detecting means, and data output means for displaying the cumulatively recorded times for the individual operating conditions cumulatively recorded by means of the timer means.

Preferably, the various operating conditions includes the power-on time of the injection molding machine; the apparatus further comprises means for calculating the respective ratios of the cumulative operation times for the individual operating conditions, determined by the timer means, to the power-on time cumulatively recorded by of the timer means, and the data output means for displaying the calculated operation time ratios for the individual operating conditions. Also, the various operating conditions include at least one of a heater heat-up time, alarm generation time, stopping time after the completion of production, manual operation time, and automatic operation time.

Further preferably, a centralized control computer 10 and a plurality of injection molding machines are connected through data transmission lines, with each of the injection molding machines provided only with the operating condition detecting means, while with the centralized control computer provided with the other means.

Furthermore, a second embodiment of the present invention comprises operating condition detecting means for detecting various operating conditions of an injection molding machine, clock means, totalization time output means for outputting a signal when an time output from the clock means agrees with a predetermined time, timer means adapted to be reset in response to the output signal from the totalization time output means and serving to cumulatively record times of various operating conditions detected by the operating condition detecting means, operation time storage means for individual operating condition for successively storing the times cumulatively recorded by the timer means in response to the output signal from the totalization time output means, and data output means for displaying the cumulatively recorded times of the individual operating conditions stored in the operation time storage means for individual operating condition.

Preferably, the various operating conditions includes the power-on time of the injection molding machine; the apparatus further comprises means for calculating the respective ratios of the cumulative operation times of the individual operating conditions, determined by the timer means, to the power-on time cumulatively recorded by the timer means; the operation time storage means for individual operating condition also stores the calculated operation time ratios; and the data output means displays the operation time ratios as well as the cumulatively recorded times of the individual operating conditions. Also, these operating conditions include at least one of a heater heat-up time, alarm generation time, stopping time after the completion of production, manual operation time, semiautomatic operation time, and automatic operation time.

Preferably, the totalization time output means outputs one signal a day, and the operation time storage means for individual operating condition stores the operation times by conditions for each day and the operation time ratios.

Preferably, the clock means has a calendar function, and includes means capable of reading the month and day delivered from the clock means in response to the output signal from the totalization time output means, adding together the operation times of the various operating conditions for each day, stored in the operation storage means for individual operating condition, when the read day is the last day of the month, calculating the respective ratios of the sum totals of the operation times of the individual states compared with the total power-on time, and storing monthly operation time storage means for individual operating condition with each sum total and each ratio stored as operation times by conditions and operation time ratio, respectively, for the read month.

Preferably, the monthly operation time storage means for individual operating condition stores data for one year, and the means for storing the monthly operation time storage means for individual operating condition rewrites stored data of each corresponding month into the calculated operation times by conditions and into operation time ratio for the month.

Further preferably, a centralized control computer and a plurality of injection molding machines are connected through data transmission lines, with each of the injection molding machines provided only with the operating condition detecting means, while with the centralized control computer provided with the other means.

According to the present invention, as described above, the elapsed times of the individual specific operating conditions of the injection molding machine are integrated and stored by the operation time storage means for individual operating condition while the individual specific operating conditions are detected by the operating condition detecting means. The integrated time stored in the operation time storage means for individual operating condition is displayed for each specific operating condition by the data output means. Further, the operation time storage means for individual operating condition calculates the ratio of the integrated time of each specific operating condition on the basis of the relationship between the power-on integrated time and another integrated time, and displays the ratio of the integrated time of each specific operating condition through the data output means. When the integrated time and the ratio of the integrated time of each specific operating condition are displayed, values in the state operation time storage means for individual operating condition are automatically initialized, and thereafter, the integrated time and the integrated time ratio of each specific operating condition are displayed in every predetermined period.

Thus, with use of the operating time analyzing apparatus according to the present invention, the chances of the measurement errors due to an operator's erroneous use of a timer, stopwatch, or the like during the operation of the machine can be eliminated, and the trouble of keeping a bothersome daily work report for recording the results of measurement will become unnecessary. Further, misreading of data or calculation errors, which are unavoidable in analyzing the integrated times through manual calculation based on firsthand time data obtained from the daily work report or the like, can be avoided, so that the reliability of the results of analysis will be improved substantially.

BRIEF DESCRIPTION OF THE DRAWINGS

FIG. 7 is a conceptual diagram showing a file for storing daily data for one month;

FIG. 8 is a conceptual diagram showing a file for storing monthly data for one year;

FIGS. 9(a) and 9(b) show a conceptual diagram showing an example of a data display mode.

DETAILED DESCRIPTION OF THE PREFERRED EMBODIMENTS

Figure 1:
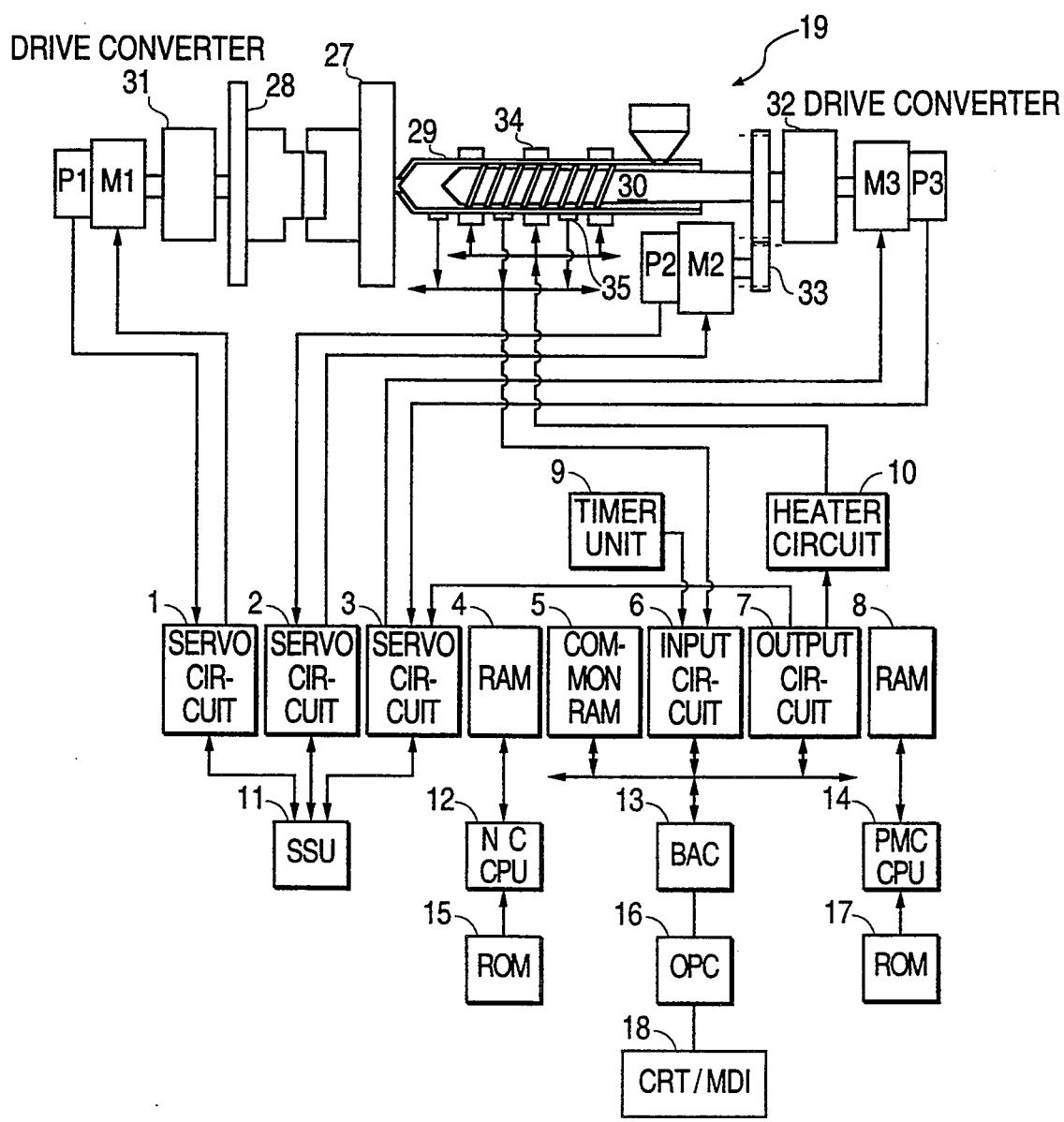
FIG. 1 is a block diagram showing the principal part of a motor-operated injection molding machine according to one embodiment of the present invention.

Embodiments of the present invention will now be described with reference to the drawings.

A motor-operated injection molding machine 19, to which an operating time analyzing apparatus according to the present invention is applied, comprises a stationary platen 27, a movable platen 28, an injection cylinder 29, and a screw 30, the injection cylinder 29 including a band heater 34 for use as heating means and a thermocouple 35 for use as temperature detecting means.

The movable platen 28 is moved along tie-bars (not shown) by means of an axial output of a servomotor M1 for mold clamping, with the aid of a drive converter 31, which is composed of a ball-nut-screw mechanism, toggle mechanism, or the like. Also, the screw 30 is moved in the axial direction by means of a servomotor M3 for injection, with the aid of a drive converter 32, which is composed of a ball-nut-screw mechanism, boss-serration mechanism or the like. Further, the screw 30 is rotated for metered kneading by means of a servomotor M2 with the aid of a transmission mechanism such as a gear mechanism 33.

A numerical control device for controlling the injection molding machine 19 comprises a microprocessor (hereinafter referred to as NCCPU) 12 for numerical control and a microprocessor (hereinafter referred to as PMCCPU) 14 for a programmable machine controller. The PMCCPU 14 is connected, though data buses, to a ROM 17, stored with programs for controlling the sequence operation of the injection molding machine and the like, and a nonvolatile RAM 8, utilized for the storage of integrated times for individual operating conditions.

The microprocessor 12 for numerical control is connected to a ROM 15 stored with management programs for generally controlling the injection molding machine 19, a RAM 4 used for temporary storage of data and the like, and a servo interface 11. Further, the servo interface 11 is connected to a servo circuit 1 of the servomotor M1 for mold clamping, a servo circuit 2 of the servomotor M2 for metering rotation, and a servo circuit 3 of the servomotor M3 for injection. Feedback signals from pulse coders P1, P2 and P3, which are attached to the servomotors M1 to M3 respectively are applied to the servo circuits 1, 2 and 3, respectively. In FIG. 1, only servomotors M1 to M3 are illustrated, and illustration of other servomotors, e.g., servomotors for ejector operation, mold thickness adjustment, nozzle touch, etc., is omitted.

The NCCPU 12 and the PMCCPU 14 are connected to each other through a bus arbiter controller 13. Also, the bus arbiter controller 13 is connected to a nonvolatile common RAM 5, an input circuit 6, and an output circuit 7 through data buses.

Further, the servo circuit 3, having a torque limit circuit built-in, receives from the output circuit 7 a torque limit value for regulating the maximum injection pressure produced by the servomotor M3 for injection. The band heater 34 is on/off-controlled by the PMCCPU 14 through the the output circuit 7 and a heater circuit 10. While, the respective temperatures of individual parts of the injection cylinder 29, detected by the thermocouple 35, are A/D-converted and applied to the input circuit 6.

Further, the current time from a clock unit 9 is applied to the input circuit 6 of the numerical control device. The clock unit 9 has an auto-calendar function to automatically update the respective numbers of the year, month, and day in accordance with preset data, as well as a function of outputting the current time expressed by hour, minute, and second.

The bus arbiter controller 13 controls the inputting and outputting of the data between the individual elements by selecting the data buses. An operator controller 16 constitutes an interface between numerical control device and a manual data input device with CRT display unit (hereinafter referred to as CRT/MDI) 18. Various set conditions for injection molding operation are set and entered in the common RAM 5 through the CRT/MDI 18 on an operator's judgment.

The CRT/MDI 18, which is composed of a control panel arranged on the injection molding machine body and terminal equipment separate from the injection molding machine body, is provided with a CRT display unit, ten-keys for data entry, soft keys for command entry, etc. The control panel of the CRT/MDI 18 is provided with a semiautomatic operation switch for starting execution of only one cycle of an injection stage from mold clamping to ejection in accordance with programs, an automatic operation switch for starting repeated execution of the injection stage, and a manual operation switch.

When manual control keys for mold clamping, metering rotation, injection, ejector operation, etc. are selectively operated, with the manual operation switch selected, the servomotors for individual axes are driven at a predetermined speed. The feed of the individual axes by the manual control keys are controlled by the NCCPU 12 in accordance with the conditions set in the common RAM 5 and the control programs stored in the ROM 15. These manual control keys, along with the semiautomatic operation switch, automatic operation switch and manual operation switch, are arranged on the control panel on the injection molding machine body.

Further, the injection molding machine 19 has an abnormality detecting function for detecting abnormality in individual parts of the injection molding machine and outputting alarms, a counting function for cumulatively storing the number of product shots, a cold start preventing function, etc. The abnormality detecting function is triggered if an abnormality is detected in the numerical control device according to self-diagnosable programs, or if an abnormality is detected in the servomotors for the individual axes. This function is triggered, for example, when positional deviation of the servomotors M1, M2 and M3 for mold clamping, metering rotation or injection has increased extraordinarily increase during operation due to the entry of any foreign matter in molds, nozzle clogging, solidification of resin, etc., or when movable units driven by the servomotors of the individual axes during manual operation overtravel to actuate limit switches. If such an abnormality is detected, the NCCPU 12 or PMCCPU 14 for controlling the operation concerned sets an alarm detection flag of the common RAM 5.

A counter for cumulatively storing the number of product shots is automatically counted up every time one cycle of the injection stage by the injection molding machine 19 is completed. When the result of the count has attained a number of productions previously set by the CRT/MDI 18, the injection molding machine 19 automatically stops in a mold open state, and the PMCCPU 14 sets a production completion flag of the common RAM 5. If the number of productions is not set, or if it is reset through the CRT/MDI 18, the value of counter and the production completion flag are reset, whereupon the automatic operation of the injection molding machine 19 will be continued until the operation is cancelled. The counter for cumulatively storing the number of product shots will never function unless the number of productions is set.

When temperatures in all zones of the injection cylinder 29, which are detected by the thermocouple 35, get in a predetermined range (e.g., ±10%) of deviation from a set value, after the heating temperature of the injection cylinder 29 is set by the CRT/MDI 18, and the band heater 34 is connected to the power supply, prior to the start of the injection molding operation, a cold start prevention timer operates for a predetermined time (normally 15 to 25 minutes). A cold start prevention flag is set in the common RAM 5 lest the injection molding machine 19 perform the injection molding operation before the predetermined time has elapsed after having been connected to the power supply. This cold start prevention flag is automatically reset when the passage of the predetermined time is detected by means of the cold start prevention timer. When the band heater 34 is connected again to the power supply, this flag will be set again.

In this arrangement, the operation of the injection molding machine 19 is controlled in a manner such that the NCCPU 12, which operates in accordance with the management programs stored in the ROM 15, distributes pulses to the individual axes through the servo interface 11, and the PMCCPU 14, which operates in accordance with the sequence programs stored in the ROM 17, manages the general sequence operation, in accordance with the set values and the like stored in the common RAM 5.

Figure 2:
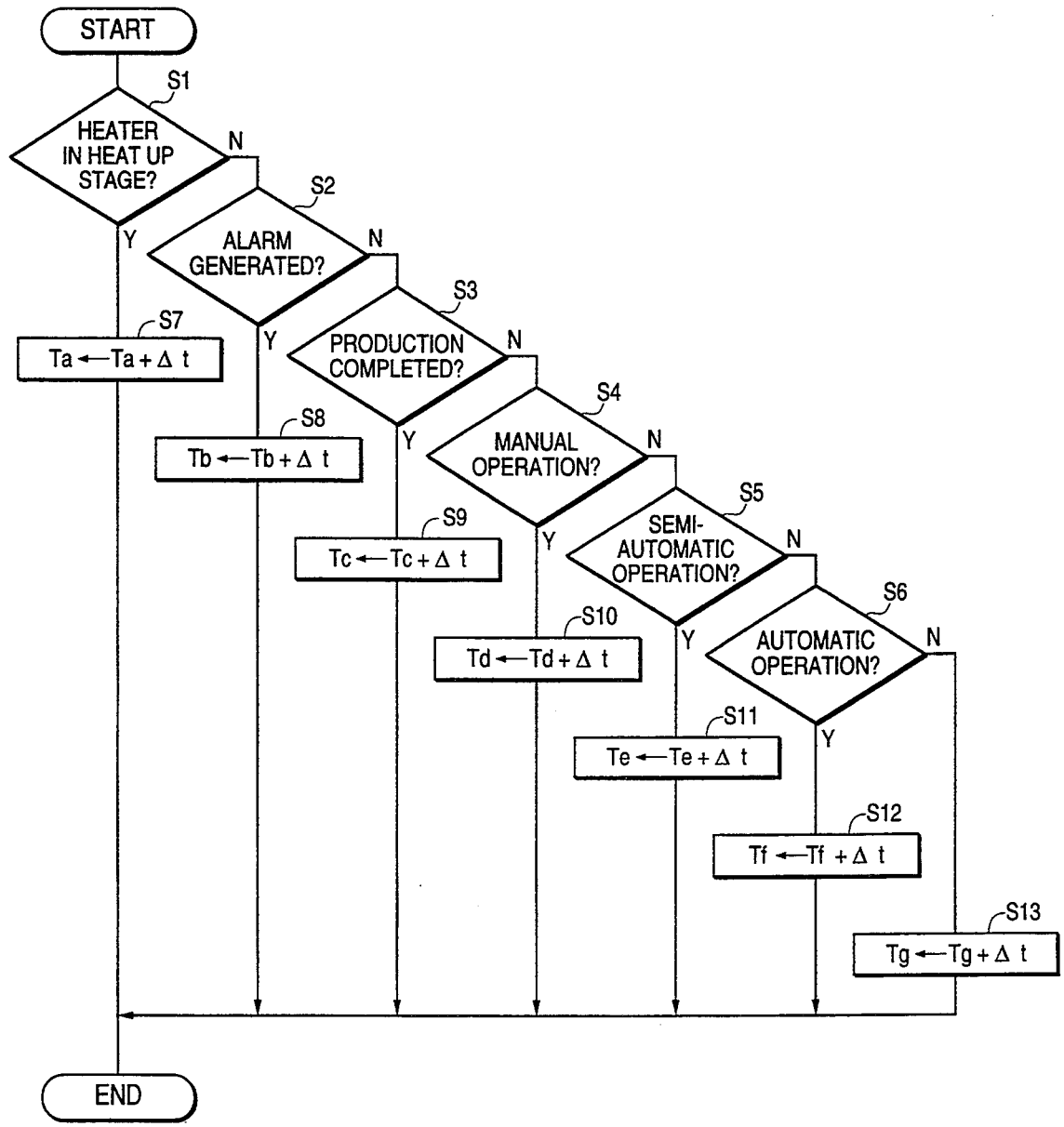
FIG. 2 is a flow chart showing an outline of a state detection processing executed by a PMCCPU according to the embodiment.
Figure 3:
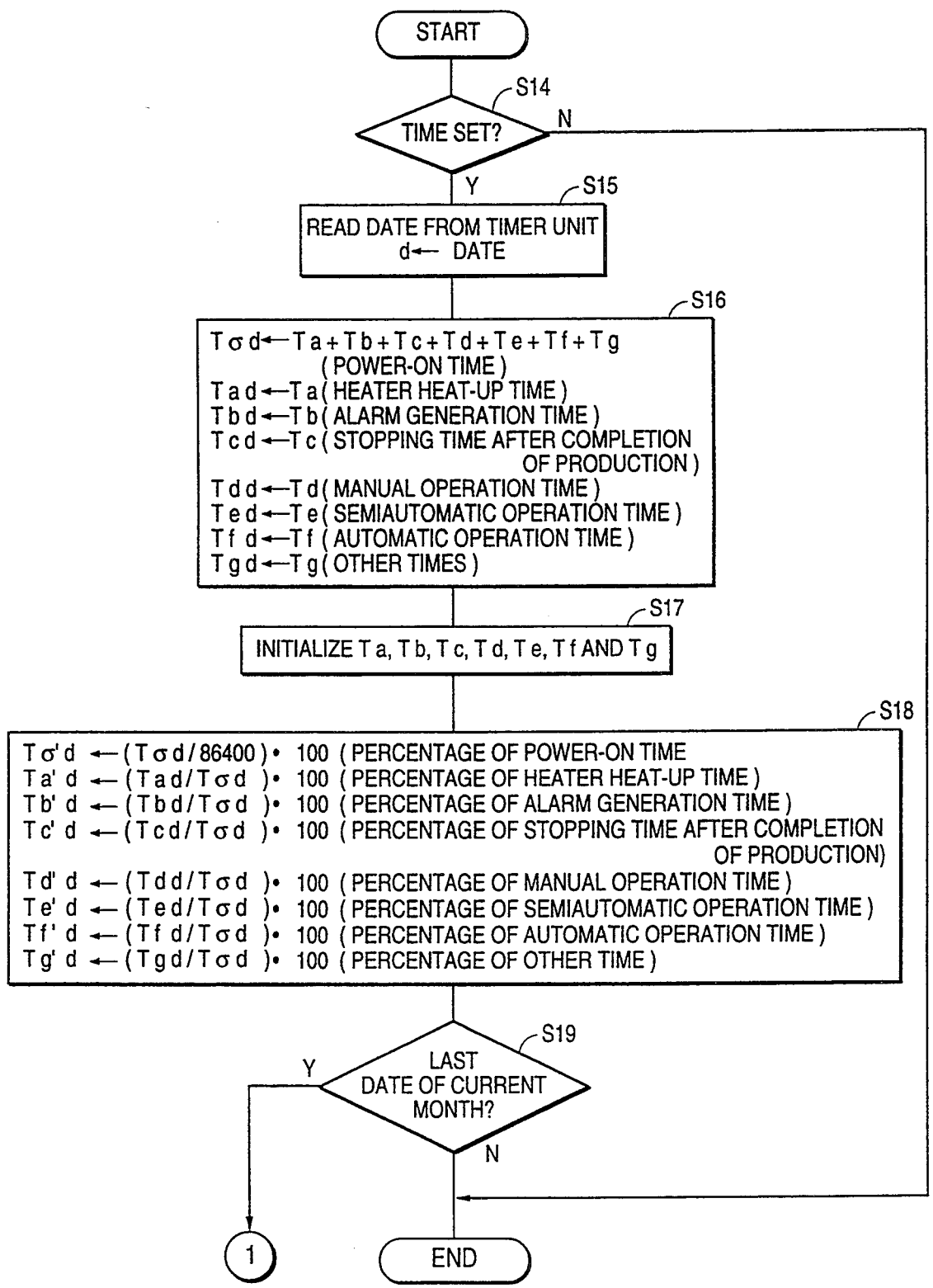
FIG. 3 is a flow chart showing an outline of an operation time storage processing executed by the PMCCPU according to the embodiment.
Figure 4:
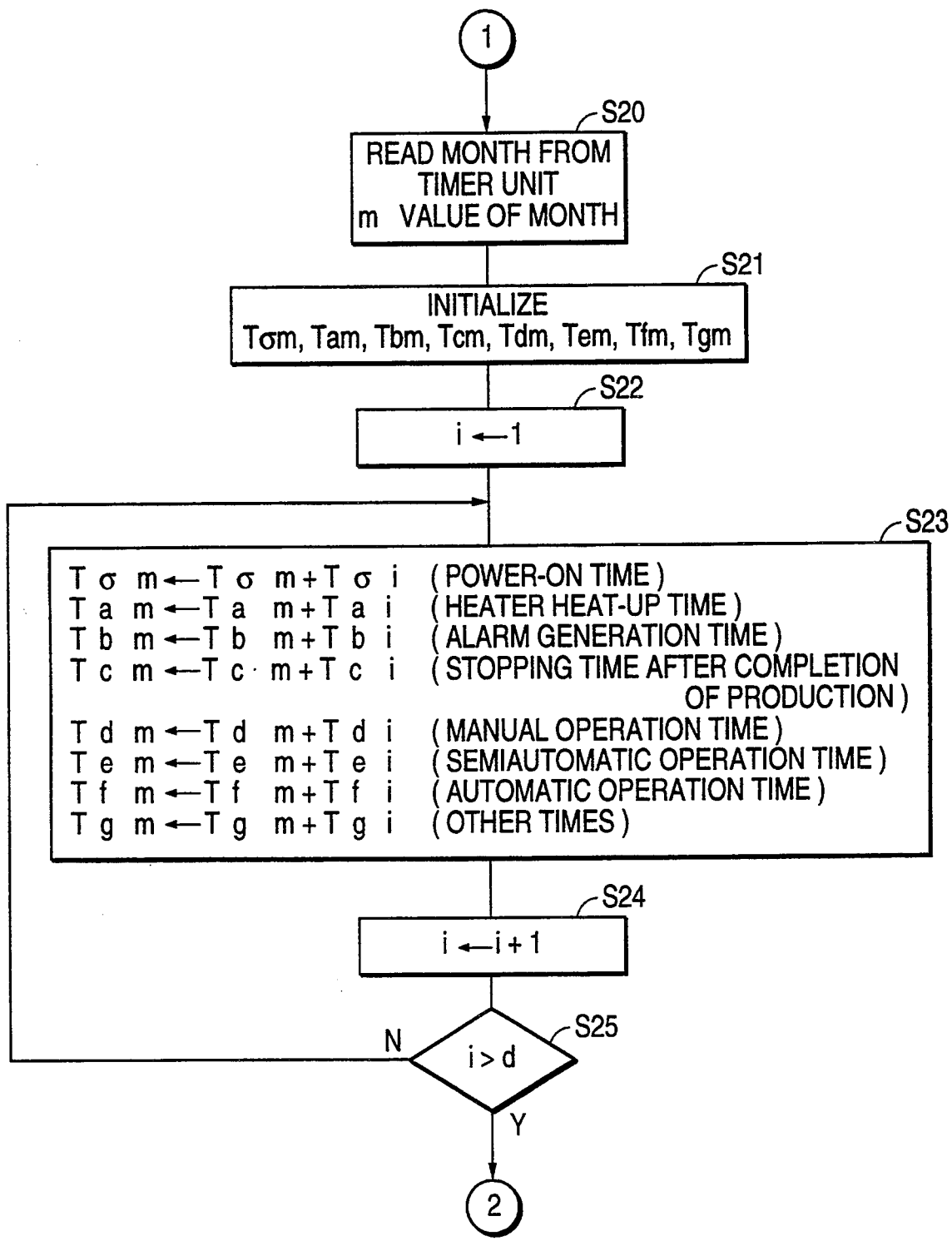
FIG. 4 is a continuation of the flow chart showing the outline of the operation time storage processing.
Figure 5:
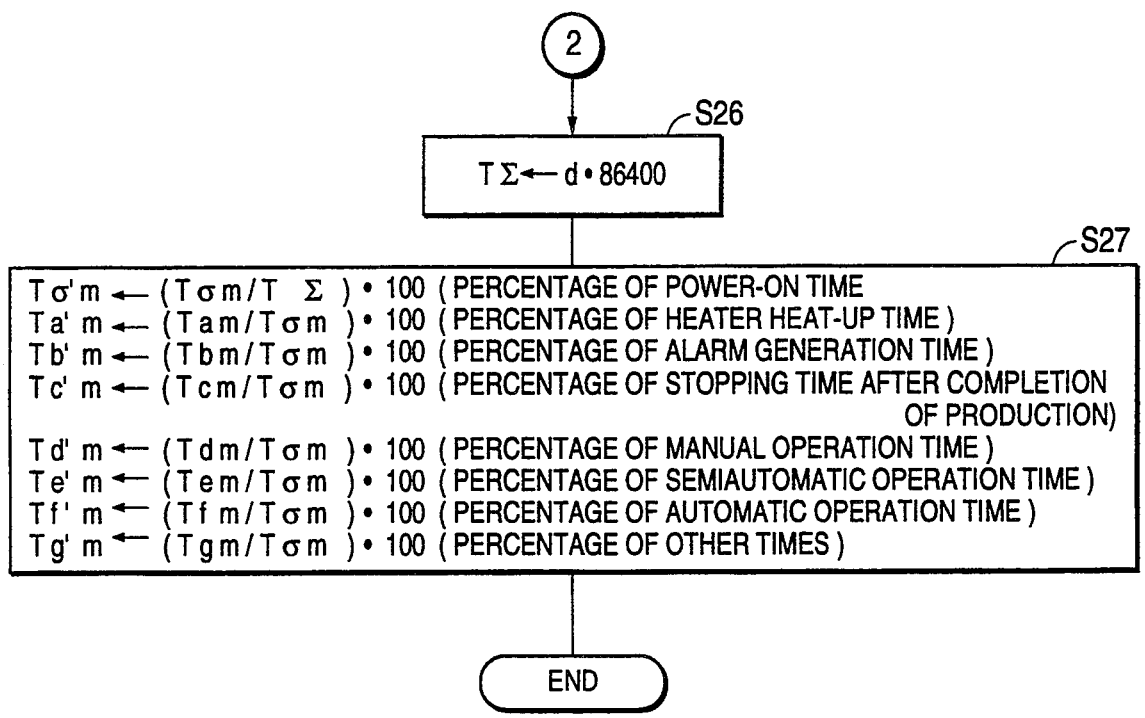
FIG. 5 is a continuation of the flow chart showing the outline of the operation time storage processing.

A state detection processing shown in FIG. 2, an operation time storage processing shown in FIGS. 3 to 5, and a display request detection processing shown in FIG. 8 are tasks stored in the ROM 17. Among these tasks, the task for the state detection processing of FIG. 2 is repeatedly executed at fine time intervals $\Delta t$ by means of the PMCCPU 14 as long as the injection molding machine 19 is connected to the power supply.

Referring now to the flow charts of FIGS. 2 to 8, the processing operation of the operating time analyzing apparatus according to the first embodiment of the present invention will be described. Various operation time storage registers (Ta, Tb, . . . ), each composed of a nonvolatile memory (not shown), are previously reset to be in their respective initial states.

Referring first to FIG. 2, the operating state detection processing of the present embodiment will be described. The PMCCPU 14 determines whether or not the cold start prevention flag is set in the common RAM 5 in the state detection processing for each predetermined cycle, that is, whether or not the band heater 34 is in a heat-up stage for heating the injection cylinder 29 (Step 1). If it is detected in this step that the band heater 34 is in the heat-up stage, the execution cycle Δt for the present processing is added to a heat-up time storage register Ta, and the heater heat-up time is cumulatively stored (Step S7), whereupon the state detection processing for this cycle is finished.

Since the injection molding operation of the injection molding machine 19 is prohibited in the heat-up stage for the band heater 34, as mentioned before, operations for any other objects of measurement cannot be executed as long as the result of decision in Step S1 is positive (Y: heater being in heat-up stage).

When the cold start prevention flag is reset after the heat-up stage for the band heater 34 is finished, the result of detection in Step S1 of the state detection processing of FIG. 1 is always negative (N), and Step S2 is entered. Thereupon, the PMCCPU 14 executes the state detection processing for the subsequent cycles.

In Step S2, the PMCCPU 14 determines whether or not the alarm detection flag is set, that is, whether or not an abnormality is detected in any part of the injection molding machine 19. If the abnormality is detected, the execution cycle Δt is added to an alarm generation time storage register Tb, and the alarm generation time is cumulatively stored (Step S8), whereupon the state detection processing for this cycle is finished. Since the operation of the injection molding machine 19 is automatically stopped when the alarm detection flag is set, operations for any other objects of measurement will not be executed while the machine is at rest.

If no alarm is detected in the state detection processing for this cycle, the PMCCPU 14 further proceeds to a discrimination processing of Step S3, whereupon it determines whether or not the production completion flag is set, that is, whether or not a predetermined number of injection molding operations are completed. If it is concluded that the predetermined number of injection molding operations are completed, the PMCCPU 14 adds the execution cycle Δt to a stopping time storage register Tc for storing the stopping time after the completion of production, and cumulatively stores the stopping time after the completion of production (Step S9), whereupon the state detection processing for this cycle is finished.

In order to drive the injection molding machine 19 after the completion of production, the production completion flag must be reset by operation through the CRT/MDI 18, without regard to the operation mode, manual, semiautomatic, or automatic, so that the operation time for the manual, semiautomatic, or automatic operation after the completion of production will not be added to the stopping time storage register Tc.

When the production completion flag is not detected, any of the manual, semiautomatic, and automatic operations can selectively be executed, so that the PMCCPU 14 proceeds to a processing for discriminating the operation mode. Thereupon, the PMCCPU 14 discriminates the activated switch out of the manual operation switch, semiautomatic operation switch, and automatic operation switch arranged on the control panel on the injection molding machine body. If the manual operation is detected, the execution cycle Δt is added to a manual operation time storage register Td, and the manual operation time is cumulatively stored (Steps S4 and S10). If the semiautomatic operation is detected, the execution cycle Δt is added to a semiautomatic operation time storage register Te, and the semiautomatic operation time is cumulatively stored (Steps S5 and S11). If the automatic operation is detected, the execution cycle Δt is added to an automatic operation time storage register Tf, and the automatic operation time is cumulatively stored (Steps S6 and S12). If none of the operation switches are activated, the execution cycle Δt is added to a register Tg for storing other operation times (Step S13).

In the state detection processing shown in FIG. 2, the order of discrimination processings for detecting specific operating conditions, such as the heat-up stage for the heater, alarm generation, production completion, etc., which never overlap one another, can be changed as required.

While the state detection processing of FIG. 2 is being executed in this manner, the PMCCPU 14 further repeatedly executes the task for the operation time storage processing shown in FIGS. 3 to 5. In this processing, current data on the hour, minute, and second is read from the clock unit 9, and it is determined whether or not the value of this data is identical with a predetermined data totalization time (Step S14). If the values are not identical, the operation time storage processing for this cycle is finished without executing the processing of Step S15 and subsequent processings, which will be mentioned later. The resolution of the clock unit 9 associated with the hour, minute, and second is matched with the execution cycle of the operation time storage processing of the PMCCPU 14, and the result of discrimination in Step S14 becomes positive (Y) only in one cycle a day.

If the current data on the hour, minute, and second, in the clock unit 9, agrees with the predetermined data totalization time, the PMCCPU 14 reads current data on the date from the clock unit 9, and stores it as a date index d (Step S15).

Subsequently, the PMCCPU 14 reads the value in the heat-up time storage register Ta, which is stored with the accumulated times for the specific operating states for a full day from the data totalization time of the preceding day to the current data totalization time, value in the alarm generation time storage register Tb, value in the stopping time storage register Tc, value in the manual operation time storage register Td, value in the semiautomatic operation time storage register Te, value in the automatic operation time storage register Tf, and values in the storage register Tg for storing the other operation times. The individual read register values (Ta to Tg) and the value of power-on time for one day, i.e., the sum of the read values, are made to respectively correspond to date index d, updated and stored in individual storage regions Tad, Tbd, Tcd, Tdd, Ted, Tfd, Tgd and Tσd of a file of the nonvolatile RAM 8 for storing everyday data for one month (Step S16). Then, all the values in the individual registers Ta to Tg are initialized (Step S1T).

Thereafter, the PMCCPU 14 calculates the ratio of the power-on time to a day and the respective ratios of the heater heat-up time, alarm generation time, stopping time after the completion of production, manual operation time, semiautomatic operation time, automatic operation time, and other operation times to the power-on time for one day are calculated individually, and the results of the calculation are updated and respectively stored in individual storage regions Tσ'd, Ta'd, Tb'd, Tc'd, Td'd, Te'd, Tf'd and Tg'd, of the file of the nonvolatile RAM 8, corresponding to the date index d (Step S18).

As shown in FIG. 7, storage regions for date addresses d=1 to 31 are set in the file of the nonvolatile RAM 8 for storing daily data for one month. These individual regions, as shown in FIG. 7, are stored with the power-on time in the day corresponding to the address d, the ratio thereof to the full day, the various operation times, and the respective ratios thereof to the power-on time.

Subsequently, the PMCCPU 14 determines whether or not the current value d of the date read last corresponds to the totalization day or the last date of the current month (Step S19). If no correspondence is discriminated, the operation time storage processing for this cycle is finished without executing the processing of Step S20 and subsequent processings, which will be described later.

If the date read last corresponds to the last date of the current month, on the other hand, the PMCCPU 14 proceeds to Step S20, whereupon it reads current data on the month from the clock unit 9, and stores it as a monthly index m. Then, after initializing all the values in individual storage regions Tσm, Tam, Tbm, Tcm, Tdm, Tem, Tfm and Tgm of a file of the nonvolatile RAM 8 for storing monthly data for one year (Step S21), 1 is set in a data read index i (Step S22).

Subsequently, the PMCCPU 14 successively reads data for individual days from the first day (i=1) to the last day (i=d) of the month, that is, values in individual storage regions Tσi, Tai, Tbi, Tci, Tdi, Tei, Tfi and Tgi, from a file (see FIG. 7) of the RAM 8 stored with daily data for one month, and cumulatively stores the read values individually in the storage regions Tσm, Tam, Tbm, Tom, Tdm, Tem, Tfm and Tgm of the separate file (see FIG. 8) of the nonvolatile RAM 8 for storing monthly data for one year (Steps S23, S24 and S25).

Thus, in the nonvolatile RAM 8 for storing monthly data for one year, the respective integrated values of the power-on time, heater heat-up time, alarm generation time, stopping time after the completion of production, manual operation time, semiautomatic operation time, automatic operation time, and other operation times, obtained in the days from the first day to the last or d'th day of the current month, are respectively stored in the storage regions Tσm, Tam, Tbm, Tcm, Tdm, Tem, Tfm and Tgm of the file (see FIG. 8) for storing data of the current month.

Then, the PMCCPU 14 calculates the total time (seconds) for the current month on the basis of the value of the last date d of the current month (Step S26), calculates the percentage of the power-on time in the month and the respective percentages of the heater heat-up time, alarm generation time, stopping time after the completion of production, manual operation time, semiautomatic operation time, automatic operation time, and other operation times, as compared with the power-on time for the month, and updates and respectively stores these values in individual storage regions Tσ'm, Ta'm, Tb'm, Tc'm, Td'm, Te'm, Tf'm and Tg'm of the file (see FIG. 8) of the nonvolatile RAM 8, corresponding to the monthly index m (Step S27). Thus, the operation time storage processing for this cycle is finished.

If the value of the last date d of the current month is 30 or less, data remaining corresponding to the address (d+1) and subsequent addresses are erased from the file (see FIG. 7) of the nonvolatile RAM 8 for storing daily data for one month, and initialized at the end of the operation time storage processing for this cycle.

The operator can be informed of daily operating time data for the current month (sometimes including part of the preceding month) or monthly operating time data for the current year (sometimes including part of the preceding year) by selecting the operating time data by means of the soft keys of the CRT/MDI 18 to have these data displayed on the CRT display unit.

Figure 6:
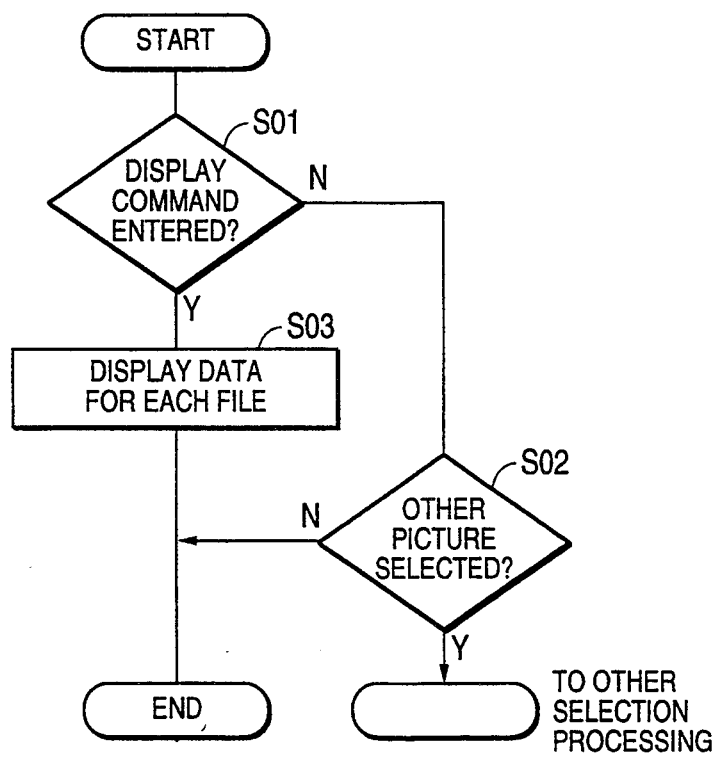
FIG. 6 is a flow chart showing an outline of a display request detection processing executed by the PMCCPU according to the embodiment.

The PMCCPU 14 repeatedly executes the display request detection processing with every predetermined cycle, as shown in the flow chart of FIG. 6, substantially in parallel with the state detection processing and the operation time storage processing described above. In this processing, the PMCCPU 14 changes the display picture on the CRT display unit, when a display request from the CRT/MDI 18 is detected (Step S01), and causes the display unit of the CRT/MDI 18 to display daily operating time data for one month, as in the data display picture shown in FIG. 9(a), and monthly operating time data for one year shown in FIG. 9(b) (Step S03).

If the time of the request for the display of the operating time data is earlier than the predetermined data totalization time, then the totalization of current day data is not completed, so that daily data for the days from the first day to the preceding day of the current month and daily data for the day of the preceding month corresponding to today and subsequent days are displayed in the display picture, which is for displaying the daily operating time data for one month, as shown in FIG. 9(a). If the data totalization time is set for 19:00:00, and if a request is made that the operating time data be displayed at 18:30:00 on July 15, for example, daily data for the days from July 1 to July 14 and daily data for the days from June 15 to June 30 are displayed. Since May and June have 31 days and 30 days, respectively, data for May 31 remain in a record of the address d=31 in the file of FIG. 7, which is stored with the daily operating time data for one month. If the value of the last date d is 30 or less, however, the processing of erasing the data corresponding to the address (d+1) and subsequent addresses is executed at the end of the operation time storage processing, so that the data for May 31 are erased when the operation time storage processing is executed on June 30. If the display of the operating time data at 18:30:00 on July 15 is requested, therefore, only the daily data for the days from July 1 to July 14 and the daily data for the days from June 15 to June 30 are displayed. If the time of the request for the display of the operating time data is later than the predetermined data totalization time, daily data for the days from the first day to the current day of the current month and daily data for the day of the preceding month corresponding to tomorrow and subsequent days are displayed. Thus, the display picture for indicating the daily operating time data for one month indicates daily data for the immediately preceding one month.

The same rule applies to the case of the monthly operating time data for one year. If the time of the request for the display of the operating time data is earlier than the predetermined data totalization time, monthly data for the months from the first month to the preceding month of the current year and monthly data for the month of the preceding year corresponding to the current and subsequent months are displayed. If the time of the request for the display of the operating time data is later than the predetermined data totalization time, on the other hand, monthly data for the months from the first month to the current month of the current year and monthly data for the month of the preceding year corresponding to the current and subsequent months are displayed, as shown in FIG. 9(b). Thus, the display picture for indicating the monthly operating time data for one year indicates monthly data for the immediately preceding year.

The respective values of the time data displayed on the CRT shown in FIG. 9 are expressed in hour, minute and second. If the other soft keys of the CRT/MDI 18 are operated with the display picture of FIG. 9 selected, the PMCCPU 14 detects this in a discrimination processing of Step S02, and then proceeds to another selection processing depending on the operation.

As described above, data output means according to the present embodiment is composed of the CRT display unit of the CRT/MDI 18, and the integrated times for the individual states of the injection molding machine 19 and the ratios thereof are totalized in a predetermined period for each day or month, stored in the files shown in FIGS. 7 and 8, and freely displayed at the operator's request. According to the present embodiment, the daily or monthly data are displayed; however, the values in the individual operation time storage registers may be displayed in response to display commands without the division on the daily or monthly basis. Even in this case, the respective percentages of the operation times for the individual operating conditions, as compared with the power-on time, are calculated and displayed.

Further, by providing a printer unit along with the CRT/MDI 18 the integrated times for the individual states and the ratios thereof may be printed out in a predetermined period for each day or month every time the processing of Step S18 or S27 in the operation time storage processing is executed.

If a file for storing the daily data for one month, such as the one shown in FIG. 7, is prepared every month, it is the same as that the daily data are stored for a whole year. With use of these data, the integrated values of the various operating times for each day of the week, average operating time associated therewith, the percentage of each day of the week compared with the various operating times for each week, etc. can be calculated.

In the embodiment described above, the data are totalized by detecting the current date or month by means of the clock unit 9 which has the calendar function. Alternatively, however, the same processing as in this embodiment may be effected by the use of a 24-hour clock unit which can be automatically reset.

The following is a brief description of a second embodiment using the 24-hour clock unit which can be automatically reset.

According to this embodiment, which are not associated with values representing the date and month, the processings of the first embodiment (FIG. 2) can first be applied directly to the operating condition detection processing. However, the processings (FIGS. 3 to 5) of the first embodiment cannot be applied directly to the operation time storage processing. This is because, according to the first embodiment, the current date is detected from the clock unit in the processing of Step S15; the last date of the current month is detected in the processing of Step S19; and the month is read in Step S20.

In the second embodiment using the 24-hour clock unit which can be automatically reset, therefore, the processings shown in FIG. 3 and subsequent drawings require modification when they are applied to the operation time storage processing. Accordingly, the discrimination processing of Step S19 is first removed from the operation time storage processing shown in FIG. 3, and a processing for incrementing the value of the date index d in order is executed in place of the processing of Step S15. The value of the date index d for the time of the first power-on operation is 0.

Thus, the value of the date index d is updated every time the set time is detected in the discrimination processing of Step S14, thereby enabling the automatic processings of Steps S18 to S18. In order to adjust the value of the date index d to the actual date, however, the value of the date index d needs to be initialized at the beginning of the month. In place of the processing of Step S20 in the operation time storage processing shown in FIGS. 4 and 5, therefore, a processing for setting the month index m and the number d of days of the month m are set by detecting a ten-key entry through the CRT/MDI 18 needs to be provided, and a processing for initializing the value of the date index d to 0 is interposed between Steps S28 and S27.

When the injection molding machine 19 is connected to the power supply to start operation, according to the arrangement modified in the manner described above, the value of the date index d is updated in order every time the arrival of the data totalization time is detected in the discrimination processing of Step S14, so that the processings of Steps S16 to S18 are automatically executed corresponding to the updated value of the date index d. If the operator sets or inputs the old month index value m and the number d of days of the month m at the end of every month in the processing which replaces Step S20 of FIG. 4, data for the days from the first day to the last or d'th day of the m'th month are automatically added up and totalized in the processings of Steps S21 to S27. Since the value of the index d is automatically initialized to 0 in the processing between Steps S26 and S27, moreover, the value of the date index d is set again to 1 on the first day of the (m+1)'th month, whereupon the processings for one month can repeatedly be executed in like manner.

Thus, in the second embodiment using the 24-hour clock unit which can be automatically reset, setting the month index m and the number d of days of the month m by means of the ten-keys requires some attentiveness; however its function and effect are substantially the same as those of the first embodiment using the clock unit 9 which has the calendar function.

In the embodiments described above, the data are totalized daily or monthly. Alternatively, however, the data may be totalized on weekly or annual basis too.

The individual operating conditions to be detected can optionally be selected depending on the configuration of the injection molding machine and the like. Further, the time consumed for conditioning or programming, the ratio thereof, and the like can be calculated and displayed by discriminating the mode of combination of the specific operating conditions. In order to calculate the time consumed for conditioning or programming, the ratio thereof, and the like, in some cases, external switches for exclusive use may be provided, or the key operation on the CRT/MDI 18 or the like may be detected, or otherwise state detection signals from inside the injection molding machine 19 may be used.

In the first and second embodiments described above, the time in one day or month during which the power is off, that is, power-off time, can be determined based on the value of the power-on time Tod for one day or the power-on time Tom for one month. Further, before the power is cut off, an external switch or those keys of the CRT/MDI 18 corresponding to items relating to the reasons for the power cut-off can be operated so that the power-off time can be stored in the nonvolatile RAM 8 for each reason. In this case, for example, the current time of the clock unit 9 can be detected in accordance with the reasons inputted through the external switch or the CRT/MDI 18 immediately before the power is cut off, and this value is stored in the nonvolatile RAM 8. Immediately after the power is turned on again, the current time is read from the clock unit 9; the value of the current time stored when the power is cut off is subtracted from the read value; and the resulting value is stored in the nonvolatile RAM 8 corresponding to the reasons for the power cut-off. Preferably, various items of reasons such as the periodical maintenance, absence of production plan, troubleshooting, etc. should be set and stored in advance.

The following is a description of a third embodiment in which a number of injection molding machines are arranged in juxtaposition for injection molding operation. In this case, a single centralized control computer is utilized for analytic operation without providing each injection molding machine with an apparatus for time analysis.

Figure 10:
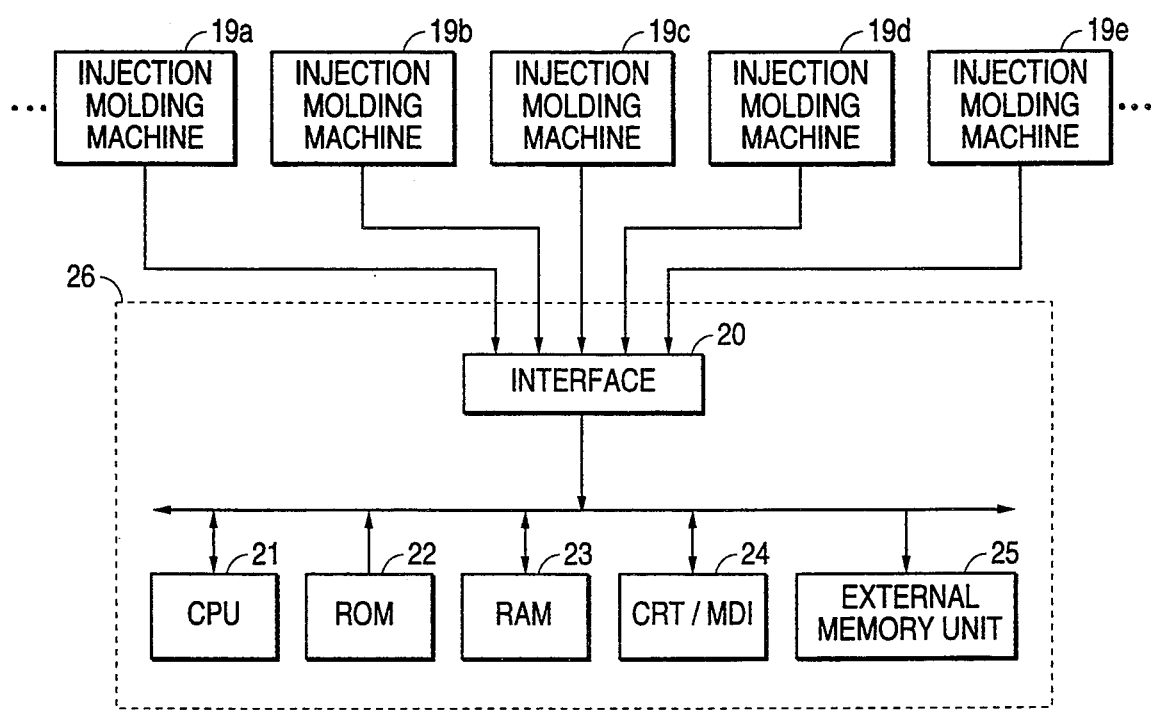
FIG. 10 is a block diagram showing an example of an operating time analyzing apparatus based on a centralized computer system.

FIG. 10 is a block diagram showing the third embodiment in which a single centralized control computer 26 is provided for a plurality of injection molding machines 19a, 19b, 19c, . . . The principal part of the centralized control computer 26 is composed of a microprocessor 21, ROM 22, RAM 23, CRT/MDI 24, and an external memory unit 25 formed of a floppy disk or hard disk. These injection molding machines 19a, 19b, 19c, . . . and the centralized control computer 28 are connected though data transmission lines extending from the injection molding machines 19a, 19b, 19c, . . . and an interface 20 on the side of the centralized control computer 26.

The hardware configuration of each of the injection molding machines 19a, 19b, 19c, . . . is substantially the same as that of the injection molding machine 19 of the foregoing first embodiment.

First, in performing data totalizing operation by means of the centralized control computer 26, a heater heat-up detection signal, alarm generation signal, production completion signal, manual operation signal, semiautomatic operation signal, automatic operation signal, etc., along with the respective codes of the individual injection molding machines, are entered in the centralized control computer 26. Then, processings for each predetermined cycle, such as the ones shown in FIG. 2 and FIGS. 3 to 5, are executed for the respective codes of the injection molding machines 19a, 19b, 19c, . . . on the side of the centralized control computer 26, and the external memory unit 25 is made to store the totalization results of data in its files, such as the ones shown in FIGS. 7 and 8, provided for each injection molding machine code. In displaying the totalization results on a CRT display screen of the manual data input device 24 with CRT display unit, the code of a desired injection molding machine is inputted through the MDI so that only the data of the desired injection molding machine are selectively displayed.

In this case, all the software required for the data totalizing operation is provided for the ROM 22 on the side of the centralized control computer 26. It is necessary, therefore, only that each of the injection molding machines 19a, 19b, 19c, . . . be provided with means for detecting specific operating conditions. Thus, this arrangement is applicable to various conventional injection molding machines, as well as to motor-operated injection molding machines, which use a control device for internal processing.

If each of the injection molding machines 19a, 19b, 19c, . . . is of the motor-operated type in which a control device is used for internal processing, load on the respective control devices of the injection molding machine and the centralized control computer 26 can be reduced by sharing the necessary processings for the data totalizing operation between the injection molding machine and centralized control computer 26.

For example, each of the injection molding machines 19a, 19b, 19c, . . . may be made to execute only a state detection processing such as the one shown in FIG. 2, so that each injection molding machine is stored with data for one day, and the respective control devices of the injection molding machines 19a, 19b, 19c, . . . are polled from the centralized control computer 26 with every data totalization time, whereby the data for each injection molding machine can be collected. Every time these data are collected, the processings shown in FIGS. 3 to 5 may be executed for each injection molding machine so that the results are stored in the external memory unit 25.

In collecting the data by means of the centralized control computer 26, the processing of the centralized control computer 26 can be executed without regard to the connection of the injection molding machine to the power supply. Therefore, the third embodiment is one suited for the case where the reasons, time, etc. for the cut-off of the injection molding machine from the power supply should be stored. It is easy to transmit the reasons for the power cut-off from the injection molding machine to the centralized control computer 26 by means of their corresponding keys so that the centralized control computer 26 can control the reasons, time, etc. for the cut-off of each injection molding machine from the power supply, corresponding to the reasons. Further, the operating conditions of the injection molding machine can be detected without interruption where detecting means for externally detecting the operating conditions of the injection molding machine without regard to the connection thereof to the power supply is provided. For example, the time for the attachment or detachment of the molds or the like after the power cut-off can be controlled for each injection molding machine by means of limit switches or the like on the stationary platen 27 or movable platen 28 for detecting the attachment and detachment of the molds.

We claim:

1. An operating time analyzing apparatus for an injection molding machine, comprising:

operating condition detecting means for detecting a plurality of operating conditions of the injection molding machine;

a plurality of timer means each for cumulatively recording elapsed time for an injection molding operation corresponding to one of said plurality of operating conditions detected by said operating condition detecting means; and data output means for displaying the cumulatively recorded elapsed time corresponding to said operating conditions.

2. An operating time analyzing apparatus for an injection molding machine according to claim 1, wherein said plurality of operating conditions include a power-on time of the injection molding machine, the apparatus further comprises means for calculating respective ratios of the cumulatively recorded times for each of the operating conditions to the power-on time cumulatively recorded by the timer means, and said data output means displays the calculated operation time ratios for each of the operating conditions.

3. An operating time analyzing apparatus for an injection molding machine according to claim 2, wherein said plurality of operating conditions include at least one of a heater heat-up time, alarm generation time, stopping time after the completion of production, manual operating time, semiautomatic operation time, and automatic operation time.

4. An operating time analyzing apparatus for an injection molding machine according to claim 3, wherein as centralized control computer and a plurality of injection molding machines are connected through transmission lines, with each of said injection molding machines provided only with the operating condition detecting means, and said centralized control computer is provided with the plurality of timer means and the data output means.

5. An operating time analyzing apparatus for an injection molding machine, comprising:
  operating condition detecting means for detecting a plurality of operating conditions of the injection molding machine;
  clock means for measuring elapsed time for an injection molding operation;
  totalization time output means for outputting a signal when a time output from said clock means agrees with a predetermined time;
  timer means adapted to be reset in response to the output signal from said totalization time output means and serving to cumulatively record times detected for said plurality of operating conditions detected by said operating condition detecting means;
  operation time storage means for successively storing the times cumulatively recorded by said timer means in response to the output signal from said totalization time output means, for each of said operating conditions; and
  data output means for displaying the cumulatively recorded times for each of the operating conditions stored in said operation time storage means.

6. An operating time analyzing apparatus for an injection molding machine according to claim 5, wherein said plurality of operating conditions include a power-on time of the injection molding machine; the apparatus further comprises means for calculating respective ratios of the cumulatively recorded times for each of the operating conditions to the power-on time cumulatively recorded by the timer means; said operation time storage means further stores the calculated operation time ratios; and said data output means displays said calculated operation time ratios as well as the cumulatively recorded times for each of the operating conditions.

7. An operating time analyzing apparatus for an injection molding machine according to claim 5, wherein said totalization time output means outputs one signal a day, and said operation time storage means stores the operation times on a daily basis.

8. An operating time analyzing apparatus for an injection molding machine according to claim 6, wherein said totalization time output means outputs one signal a day, and said operation time storage means stores the daily operation times based on and said operation time ratios.

9. An operating time analyzing apparatus for an injection molding machine according to claim 7, wherein said clock means further operates according to a calendar, and includes means for reading a month and a day delivered from said clock means in response to the output signal form said totalization time output means, for adding together the operation times for the plurality of operating conditions for each day stored in said operation time storage means for each of said operating conditions, when the read day is the last day of the month, and for storing monthly in said operation time storage means each sum total stored as operation times for said read month.

10. An operating time analyzing apparatus for an injection molding machine according to claim 9, wherein said monthly operation time storage means further stores data for one year, and said monthly operation time storage means further rewrites stored data for each corresponding month into the monthly calculated operation times.

11. An operating time analyzing apparatus for an injection molding machine according to claim 8, wherein said clock means further operates according to a calendar, and includes means for reading the month and day delivered from said clock means in response to the output signal from said totalization time output means, adding together the operation times for the plurality of operating conditions for each day stored in said operation storage means, when the read day is the last day of the month, calculating the respective ratios of the sum totals of the operation times for each of the operating conditions compared with the total power-on time, and storing monthly in said operation time storage means each sum total and each ratio stored as operation times according to said operation time ratio, respectively, for said read month.

12. An operating time analyzing apparatus for an injection molding machine according to claim 11, wherein said wherein said monthly operation time storage means further stores data for one year, and said monthly operation time storage means further rewrites stored data for each corresponding month into the operation times according to the operation time ratio for the month.

13. An operating time analyzing apparatus for an injection molding machine according to claim 10, wherein said plurality of operating conditions include at least one of a heater heat-up time, alarm generation time, stopping time after the completion of production, manual operation time, semiautomatic operation time, and automatic operation time.

14. An operating time analyzing apparatus for an injection molding machine according to claim 12, wherein said plurality of operating conditions include at least one of a heater heat-up time, alarm generation time, stopping time after the completion of production, manual operation time, semiautomatic operation time, and automatic operation time.

15. An operating time analyzing apparatus for an injection molding machine according to claim 13, wherein a centralized control computer and a plurality of injection molding machines are connected through data transmission lines, with each of said injection molding machines provided only with the operating condition detecting means, while with said centralized control computer is provided with the other clock means, totalization time output means, timer means, operation time storage means and data output means.

16. An operating time analyzing apparatus for an injection molding machine according to claim 14, wherein a centralized control computer and a plurality of injection molding machine are connected through data transmission lines, each said injection molding machine being provided with the operating condition detecting means only, and said centralized control computer being provided with clock means, totalization time output means, timer means, operation time storage means and data output means.

17. An operating time analyzing apparatus for an injection molding machine according to claim 12, wherein a centralized control computer and a plurality of injection molding machine are connected through data transmission lines, with each said injection molding machines provided with the operating condition detecting means only, and said centralized control computer is provided with clock means, totalization time output means, timer means, operation time storage means and data output means.

* * * * *

UNITED STATES PATENT AND TRADEMARK OFFICE
CERTIFICATE OF CORRECTION

PATENT NO. : 5,344,301
DATED : September 6, 1994
INVENTOR(S) : Masao Kamiguchi et al It is certified that error appears in the above-indentified patent and that said Letters Patent is hereby corrected as shown below:

Column 2, line 6, delete "10".

Column 6, line 52, "FIG. 8" should be --FIG. 6--.

Column 6, line 57, "FIGS. 2 to 8" should be --FIGS. 2 to 6--.

Column 8, line 58, "(Step SIT)" should be --(Step S17)--.

Column 9, line 35, "Tom" should be --Tcm--.

Column 12, line 13, "S18 to S18" should be --S16 to S18--.

Column 12, line 23, "S28 and S27" should be --S26 and S27--.

Column 13, line 37, "28" should be --26--.

UNITED STATES PATENT AND TRADEMARK OFFICE
CERTIFICATE OF CORRECTION

PATENT NO. : 5,344,301

DATED : September 6, 1994

INVENTOR(S) : Masao Kamiguchi et al

It is certified that error appears in the above-indentified patent and that said Letters Patent is hereby corrected as shown below:

Column 15, Claim 3, line 16, "operating" should be --operation--.

Column 15, Claim 4, line 19, "as" should be --a--.

Column 16, Claim 8, line 5, delete "and".

Column 16, Claim 9, line 12, "form" should be --from--.

Column 16, Claim 12, line 45, delete "wherein said" (second occurrence).

Column 17, Claim 15, line 3, "while with" should be --and--.

Signed and Sealed this

Twenty-ninth Day of November, 1994

Attest:

BRUCE LEHMAN

Attesting Officer

Commissioner of Patents and Trademarks